US00RE41335E

(19) United States
(12) Reissued Patent
Doers

(10) Patent Number: US RE41,335 E
(45) Date of Reissued Patent: May 18, 2010

(54) INTERNAL COMBUSTION ENGINE

(75) Inventor: Douglas A. Doers, Franklin, WI (US)

(73) Assignee: DeltaHawk Engines, Inc., Racine, WI (US)

(21) Appl. No.: 11/234,819

(22) Filed: Sep. 23, 2005

Related U.S. Patent Documents

Reissue of:
(64) Patent No.: 6,622,667
Issued: Sep. 23, 2003
Appl. No.: 09/663,838
Filed: Sep. 15, 2000

U.S. Applications:
(60) Provisional application No. 60/220,787, filed on Jul. 25, 2000.

(51) Int. Cl.
*F02M 15/00* (2006.01)
*F01P 1/06* (2006.01)

(52) U.S. Cl. ..... 123/41.31; 123/41.1; 123/541; 123/514

(58) Field of Classification Search ..... 123/469–470, 123/41.31, 41.82, 41.82 R, 459, 541, 41.42, 123/514
See application file for complete search history.

(56) References Cited

U.S. PATENT DOCUMENTS 1,355,068 A 10/1920 Vincent (Continued)

FOREIGN PATENT DOCUMENTS

DE 1153211 8/1963

(Continued)

OTHER PUBLICATIONS

Preliminary Amandement submitted Aug. 3, 2006 from U.S. Appl. No. 11/498913.

(Continued)

*Primary Examiner*—Hai H Huynh
(74) *Attorney, Agent, or Firm*—Micheal Best & Friedrich LLP

(57) ABSTRACT

Improved internal combustion engine, particularly, an improved two-stroke, diesel aircraft engine. A first improvement includes a wrist pin/connection rod assembly. A plurality of fasteners extend through a wall of a wrist pin and into a wrist pin insert to secure the wrist pin to a cradle-like portion of a connecting rod. A second improvement includes a fuel injection system which cools fuel injectors with overflow fuel from a fuel pump. The overflow fuel is warmed as it cools the fuel injectors, thereby preventing ice-build up on a fuel filter in cold weather as the overflow fuel is recirculated to the fuel pump. A third improvement includes a new cylinder head cooling arrangement. The cylinder head and a cooling cap define an annular cooling passageway. Cooling fluid flows through the annular cooling passageway to cool the cylinder head. The cooling cap includes an inlet port and an outlet port which are not diametrically opposed. Accordingly, the annular cooling passageway includes a restricted portion to ensure cooling fluid flows completely around the annular cooling passageway to better cool the cylinder head. The cooling cap is adjustably mounted on the cylinder head, so that the cooling cap can be coupled to a cooling jacket independent of the location of the cylinder head on the engine or cylinder block, as when the cylinder head threads into the engine block. The same clamping device used to connect the cooling cap to the cylinder head can be used to secure the fuel injector to the cylinder head. A fourth improvement includes a cross-feed cooling passageway extending between multiple cylinder banks to provide thermal coupling between the cylinder heads and the lower crankcase of the engine, and to provide a safety arrangement for continued cooling fluid flow at least in the event a thermostat in communication with a cooling jacket should fail.

14 Claims, 5 Drawing Sheets

U.S. PATENT DOCUMENTS

| | | | |
|---|---|---|---|
| 1,875,580 | A | 9/1932 | Fisher |
| 2,065,602 | A | 12/1936 | Meyer |
| 2,152,594 | A | 3/1939 | Klotsch |
| 2,387,114 | A | 10/1945 | Bonbright et al. |
| 2,397,114 | A | 3/1946 | Anzalone |
| 2,528,665 | A | 11/1950 | Peterson et al. |
| 2,855,911 | A | 10/1958 | Christiansen |
| 3,125,082 | A | 3/1964 | Stansfield et al. |
| 3,476,021 | A | 11/1969 | Williams |
| 3,612,012 | A | 10/1971 | Dreisin |
| 3,762,389 | A | 10/1973 | Malina |
| 3,765,384 | A | 10/1973 | Barnard |
| 3,942,487 | A | 3/1976 | Zink |
| 3,945,353 | A | 3/1976 | Dreisin |
| 4,066,057 | A | 1/1978 | Hale |
| 4,112,906 | A | 9/1978 | Spencer |
| 4,131,093 | A | 12/1978 | Mansfield |
| 4,237,847 | A | 12/1980 | Baugh et al. |
| 4,291,650 | A | 9/1981 | Formia et al. |
| 4,328,772 | A | 5/1982 | Heydrich et al. |
| 4,404,935 | A | 9/1983 | Kraft |
| 4,510,420 | A | 4/1985 | Sasso |
| 4,562,798 | A | 1/1986 | van Os |
| 4,635,596 | A | 1/1987 | Nakano et al. |
| 4,781,028 | A | 11/1988 | Zoche |
| 4,834,030 | A | 5/1989 | Bauer |
| 4,953,525 | A | 9/1990 | Sakurai et al. |
| 4,957,085 | A | 9/1990 | Sverdlin |
| 5,044,339 | A | 9/1991 | Udo Hafner |
| 5,058,535 | A | 10/1991 | Wilkinson |
| 5,065,707 | A | 11/1991 | Elsbett et al. |
| 5,072,654 | A | 12/1991 | MacGregor |
| 5,094,217 | A | 3/1992 | Kaku et al. |
| 5,195,468 | A | 3/1993 | Clark et al. |
| 5,209,197 | A | 5/1993 | Melchior |
| 5,279,268 | A | 1/1994 | Brink et al. |
| 5,413,074 | A | 5/1995 | Horiuchi |
| 5,427,067 | A | 6/1995 | Horiuchi |
| RE35,079 | E | 11/1995 | Sverdlin |
| 5,505,166 | A | 4/1996 | Katoh |
| 5,529,027 | A | 6/1996 | Okubo |
| 5,560,332 | A | 10/1996 | Chang |
| 5,560,333 | A | 10/1996 | Genouille |
| 5,577,472 | A | 11/1996 | Banta, III et al. |
| 5,632,255 | A | 5/1997 | Ferrenberg |
| 5,649,509 | A | 7/1997 | Chang |
| 5,655,496 | A | 8/1997 | Pong |
| 5,860,394 | A | 1/1999 | Saito et al. |
| 5,878,703 | A | 3/1999 | Sweeney |
| 5,924,407 | A | 7/1999 | Iwaszkiewicz et al. |
| 5,975,032 | A | 11/1999 | Iwata |
| 6,019,081 | A | 2/2000 | Divecha et al. |
| 6,058,910 | A | 5/2000 | Simmons et al. |
| 6,167,848 | B1 | 1/2001 | Frantzheld |
| 6,199,520 | B1 | 3/2001 | Warren |
| 6,427,642 | B1 | 8/2002 | Beer et al. |
| 6,622,667 | B1 | 9/2003 | Doers |
| 6,681,727 | B2 | 1/2004 | Krenn |
| 6,682,380 | B1 | 1/2004 | Irwin et al. |
| 6,769,383 | B2 | 8/2004 | Doers et al. |
| 7,331,331 | B2 * | 2/2008 | Hanawa et al. ..... 123/470 |
| 2005/0235946 | A1 | 10/2005 | Doers et al. |

FOREIGN PATENT DOCUMENTS

| | | | |
|---|---|---|---|
| DE | 9421142 | U1 | 10/1995 |
| EP | 0488431 | A2 | 6/1992 |
| EP | 0603961 | A1 | 6/1994 |
| EP | 1106802 | A1 | 6/2001 |
| JP | 200142577 | A | 5/2000 |
| WO | 0208591 | A1 | 1/2002 |
| WO | 02/008591 | A1 | 1/2002 |

OTHER PUBLICATIONS

Office Action dated Apr. 19, 2007 from U.S. Appl. No. 11/498913.

Response to Office Action of Apr. 19, 2007 from U.S. Appl. No. 11/498,913.

Notice of Allowance dated Nov. 27, 2007 from U.S. Appl. No. 11/498,913.

Provisional Application 60/220,787, filed Jul. 25, 2000, inventor Doers.

Utility Application 10/540,049, filed Jun. 22, 2005, inventor Doers et al.

Utility Application 11/498,913, filed Aug. 3, 2006, inventor Doers et al.

* cited by examiner

INTERNAL COMBUSTION ENGINE

Matter enclosed in heavy brackets [ ] appears in the original patent but forms no part of this reissue specification; matter printed in italics indicates the additions made by reissue.

CROSS-REFERENCE TO RELATED APPLICATIONS

This application claims the benefit of U.S. Provisional Application No. 60/220,787, filed Jul. 25, 2000.

BACKGROUND OF THE INVENTION

The present invention relates generally to internal combustion engines. More particularly, the present invention relates to two-stroke, diesel aircraft engines.

As generally known, the overall operation, reliability and durability of internal combustion engines depends on a number of design characteristics. One such design characteristic involves the piston pin or wrist pin/connecting rod connection. Uneven wear, excessive deflection or other structural deformities of the wrist pin will adversely affect the performance of an engine. Another design characteristic involves providing adequate cooling for fuel injectors. Generally, fuel injectors are in close proximity to the high heat regions of the combustion chambers. Without proper cooling, a fuel injector can malfunction and, in some cases, completely fail. Another design characteristic involves sufficiently cooling the cylinder heads. Thermal failure or cracking of a cylinder head results in costly repairs to the engine. Yet another design characteristic involves providing coolant to cooling jackets in multiple cylinder engines having a plurality of cylinder banks. Inadequate flow or obstructed flow of the coolant through the cooling jacket can result in engine failure.

SUMMARY OF THE INVENTION

The present invention provides an internal combustion engine having many advantages over prior art engines. In particular, the present invention provides certain improvements that are particularly well suited for use in two-stroke, diesel aircraft engines. The invention includes a new wrist pin/connecting rod connection, a new cooling system for fuel injectors, a new cylinder head cooling arrangement and a new cooling jacket cross-feed arrangement.

The wrist pin, especially in two-stroke diesel engines, is nearly continuously under load. It is not uncommon for wrist pins to deflect under heavy or continuous loads. A heavy or thick walled wrist pin reduces the deflection, but at the cost of a substantial increase in weight. Thus, there is a need for a new wrist pin/connecting rod assembly which makes it less likely that the wrist pin will deflect under heavy or continuous loads, yet which does not appreciably add to the overall weight of the engine.

Providing a wrist pin/connecting rod assembly in which the wear on the bearing surface of the wrist pin is evenly distributed is difficult at best. Uneven wear of the wrist pin bearing surface can result in poor engine performance. Thus, there is a need for a wrist pin/connecting rod assembly which minimizes uneven wear on the wrist pin bearing surface.

Accordingly, the invention provides a connecting rod with a cradle-like upper end. In other words, the upper end of the connecting rod has an arcuate portion and does not encircle the wrist pin. The wrist pin has an outer surface in engagement with the arcuate portion of the connecting rod, and a plurality of fasteners (e.g., screws) secure the wrist pin to the arcuate portion of the connecting rod by extending through the wall of the wrist pin and into an insert within the wrist pin. Because the arcuate portion of the connecting rod does not completely encircle the wrist pin, the entire "top" of the wrist pin (the side of the wrist pin farthest from the crankshaft and nearest the piston crown) can bear against the piston. In other words, a longitudinal portion of the wrist pin that does not engage the arcuate portion of the connecting rod can bear against the piston. This results in the load and the wear being more evenly distributed across substantially the entire longitudinal length of the wrist pin and, therefore, a lighter wrist pin than would otherwise be necessary can be used. Moreover, the wrist pin insert stiffens the wrist pin, also allowing the use of a thinner wrist pin. In addition, because the wrist pin cannot pivot relative to the connecting rod, the forced movement or rocking of the wrist pin as the connecting rod pivots during operation of the engine aids in oiling and minimizes uneven wear on the wrist pin bearing surface.

Fuel injectors are subject to intense thermal conditions because of their general proximity to the cylinder heads. One way to cool fuel injectors is to install the fuel injectors through cooling jackets which are adjacent the cylinder heads. The cooling jackets can cool both the cylinder heads and the fuel injectors. However, cooling jackets are not always sufficient to cool the fuel injectors. Moreover, in some engine designs, cooling jackets are not located in positions which allow them to be used to cool the fuel injectors. Thus, there is a need for a new fuel injector cooling system which enhances operation of or operates independent from a cooling jacket.

Fuel pumps generally deliver more fuel than the fuel injection system and engine can utilize at any given moment. As a result, the excess fuel is typically returned to a fuel supply tank for further use. Rather than returning the overflow fuel from the fuel pump directly to the fuel supply tank, the present invention utilizes the overflow fuel to cool the fuel injectors. Circulating the overflow or bypass fuel from the fuel pump through the fuel injectors for the purpose of cooling the fuel injectors makes use of an existing liquid flow not previously used to cool the fuel injectors. The overflow fuel flows into each fuel injector via a newly-provided inlet port and flows out through the known leak-off port. It is not uncommon for engine coolant in a cooling jacket to reach temperatures in excess of 240° F. The overflow fuel is significantly cooler than the engine coolant running through the cooling jacket, thereby providing an improved method of cooling the fuel injector to increase fuel injector life. In those engines which do not use a cooling jacket, the fuel injector cooling system of the present invention provides a new way of cooling the fuel injectors.

Accordingly, the invention also provides a fuel injection system having a fuel injector for injecting fuel into a combustion chamber. The fuel injector includes a fuel inlet port, a fuel outlet port and a fuel passage communicating between the fuel inlet port and the fuel outlet port. The fuel injector further includes a cooling fuel inlet port, a leak-off fuel outlet port and a cooling fuel passage communicating between the cooling fuel inlet port and leak-off fuel outlet port. The fuel injection system includes a bypass fuel line which communicates between a fuel pump and the cooling fuel inlet port of the fuel injector. Overflow fuel from the fuel pump flows through the bypass fuel line and through the fuel injector to cool the fuel injector. Using the excess fuel from the fuel pump to cool the fuel injector simplifies or supplants the cooling jacket.

A problem particularly prevalent with aircraft engines concerns ice build-up on the fuel filter due to cold outside temperatures. The overflow fuel which cools the fuel injectors is warmed as it flows through the fuel injectors. The warmed overflow fuel is recirculated through the fuel injection system to travel through the fuel filter so as to provide the additional benefit of resisting ice build-up on the fuel filter in cold weather.

Radiant and conductive heating of a cylinder head can raise the temperature of the cylinder head above its metallurgical and structural limits. Traditionally, cylinder heads are bolted or otherwise secured to the cylinder block or engine block with a suitable head gasket therebetween to effectively seal the cylinder heads and provide the cooling means for the cylinder head. According to a preferred embodiment of the present invention, the cylinder head threads into the engine block. Because of this, cooling passages normally provided between the engine block and the cylinder head cannot be utilized. Thus, there is a need for a cylinder head cooling arrangement which is not dependent on the location of the cylinder head with respect to the engine block, as in the case with prior engine designs.

Accordingly, in another aspect of the present invention, a cooling cap is mounted on the cylinder head. The cooling cap includes an annular coolant groove which mates with an annular coolant groove in the cylinder head to define an annular cooling passageway. The cooling cap further includes inlet and outlet ports which communicate with the cooling passageway, so that cooling fluid can flow through the cooling passageway to cool the cylinder head. The cooling cap is adjustably positionable on the cylinder head, such that the inlet and outlet ports of the cooling cap can be properly aligned with ports in the engine block. In other words, the cooling cap is connectable to a cooling jacket in the engine block regardless of the position of the cylinder head with respect to the cylinder block or engine block. Because the cylinder head threads into the engine block, it is not known exactly where the cylinder head will be positioned in terms of the engine block. Thus, the adjustable cooling cap of the present invention is especially advantageous in an engine in which the cylinder head threads into the engine block.

Threading the cylinder head into the engine block according to the present invention provides the added benefit of eliminating the bolt and head gasket system of prior engines. This eliminates a possible point of failure, while at the same time reducing the number of parts to assemble the engine. According to one aspect of the present invention, the engine block includes female threads concentric with the cylinder and the cylinder head includes male threads which engage the female threads on the engine block.

In V-type engines, a cooling jacket and an associated thermostat are typically provided for each cylinder bank. A problem with such prior arrangements is that if one thermostat fails, there is no mechanism to allow cooling fluid to flow through the associated cooling jacket. Another problem with such prior designs is that the temperature gradient between the hot cylinder heads and the cooler lower crankcase can be significant, thereby adding undesirable stress to the engine block and other engine components. Thus, there is a need for a new system which provides redundancy of thermostat operation and thermal coupling between the cylinder heads and the lower portion of the engine.

Accordingly, the invention also provides a cross-feed cooling passageway in the engine block of a V-type engine. The cooling passageway extends between a first cooling jacket adjacent a first cylinder bank and a second cooling jacket adjacent a second cylinder bank. A first thermostat communicates with the first cooling jacket and a second thermostat communicates with the second cooling jacket. The cooling passageway provides cooling fluid flow between the cooling jackets. This is particularly advantageous in the event that one of the thermostats fails. The cross-feed passageway will allow the cooling fluid to continue to flow if one thermostat fails, so as to reduce the possibility of damage to the engine from over-heating. Another advantage of the cooling passageway is that it reduces the temperature gradient between the cylinder heads and the lower crankcase.

Other features and advantages of the present invention will become apparent to those skilled in the art upon review of the following detailed description, claims and drawings in which like numerals are used to designate like features.

BRIEF DESCRIPTION OF THE DRAWINGS

FIG. 7 is also an enlarged view of a portion of FIG. 2 illustrating in greater detail, among other things, the cylinder, the cylinder head, the fuel injector and the cooling cap.

Figure 1:
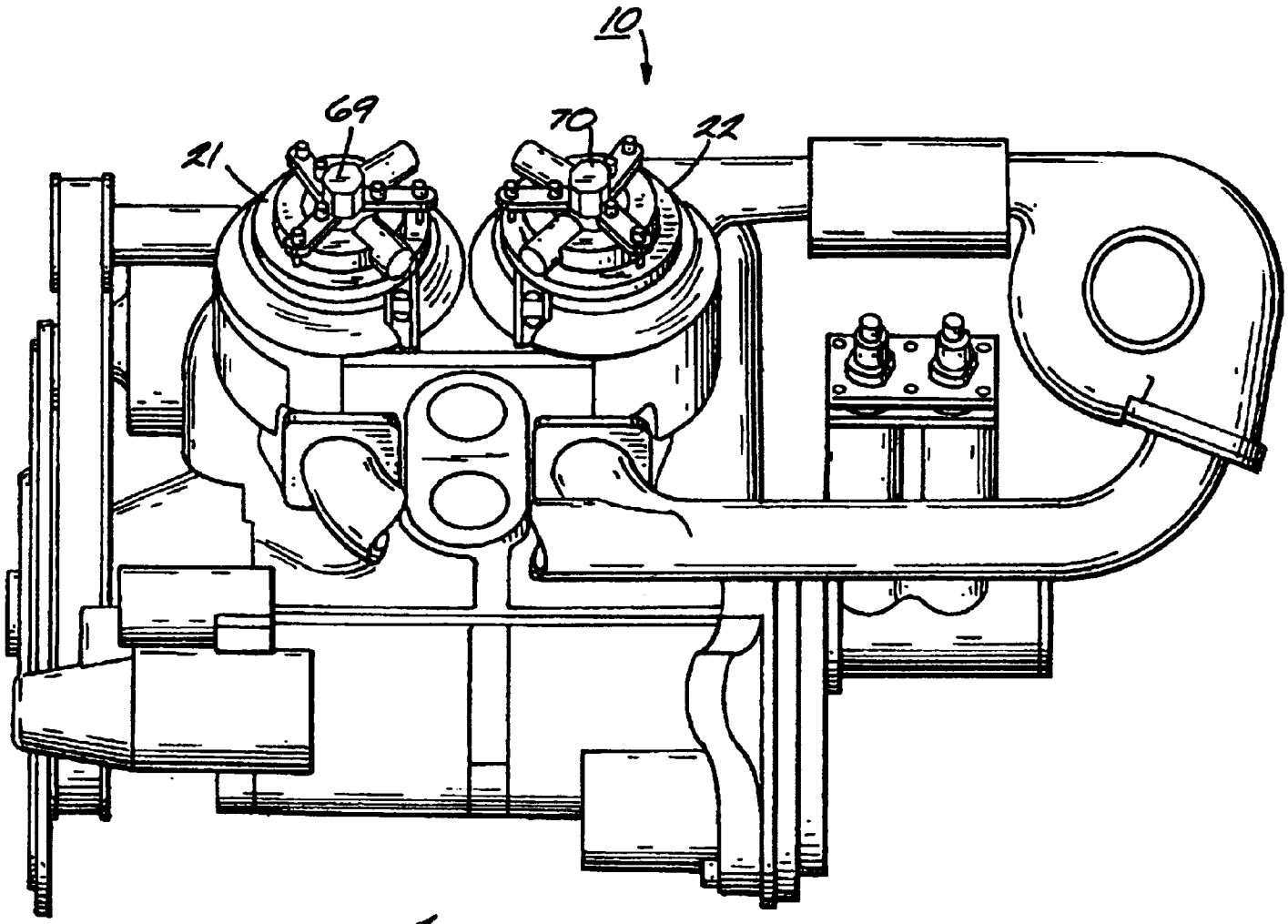
FIG. 1 is an elevational view of an internal combustion engine in which the present invention is employed.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof. The use of "consisting of" herein is meant to encompass only the items listed thereafter and the equivalents thereof.

DESCRIPTION OF THE PREFERRED EMBODIMENTS

Illustrated in FIG. 1 is an internal combustion engine 10 in which the present invention is employed. It should be understood that the present invention is capable of use in other engines, and the engine 10 is merely shown and described as an example of one such engine. The engine 10 is a two-stroke, diesel aircraft engine. More particularly, the engine 10 is a V-type engine with four-cylinders. The improvements described herein are particularly well suited for use in such engines, but may be used in other internal combustion engines.

Figure 2:
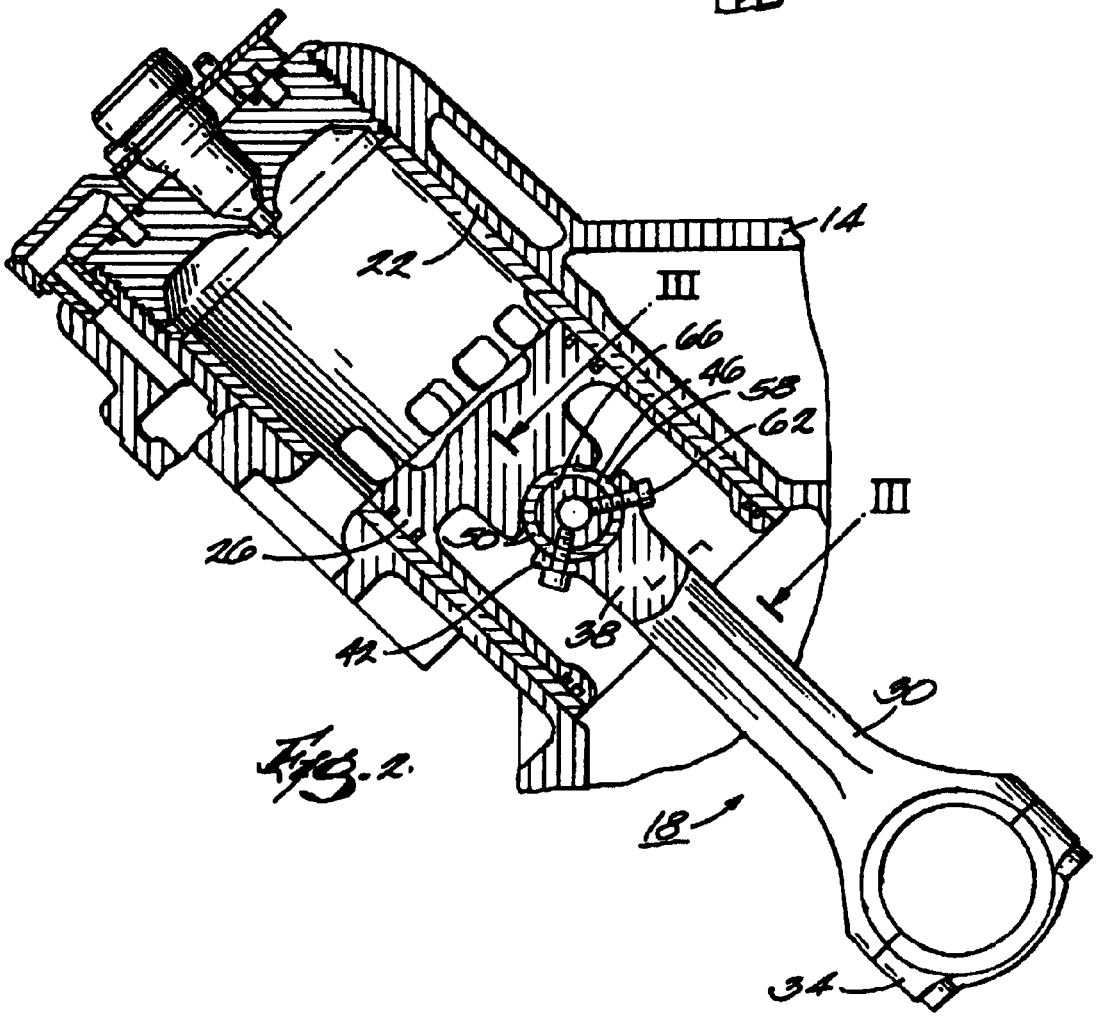
FIG. 2 is a sectional view illustrating, among other things, a cylinder head, a cylinder, a piston and a connecting rod of the engine of FIG. 1.

FIG. 2 shows a section view of a portion of the engine 10 of FIG. 1. An engine block 14 at least partially defines a crankcase 18 (see also, FIG. 9) and two banks of four cylinders (only two are illustrated and have reference numerals 21 and 22 in FIG. 1). The four cylinders are generally identical, and only one cylinder 22 will be described in detail. A crankshaft (not shown) is rotatably supported within the crankcase 18. A piston 26 reciprocates in the cylinder 22 and is connected to the crankshaft via connecting rod 30. As the piston 26 reciprocates within the cylinder 22, the crankshaft rotates.

The connecting rod 30 includes a first end 34 which is connected to the crankshaft. The connecting rod 30 further includes a second end 38 which includes an arcuate portion 42 that does not completely encircle the wrist pin 46. Preferably, the arcuate portion 42 of the connecting rod 30 has an arcuate extent that is about or slightly less than 180°. A wrist pin 46 having an annular wall 50 including a cylindrical inner surface 54 (FIG. 3) and a cylindrical outer surface 58, which engages the arcuate portion 42 of the connecting rod 30, is pivotally connected to the piston 26. A plurality of fasteners 62 extend through the annular wall 50 of the wrist pin 46 and into a wrist pin insert 66 (see also, FIG. 3) to secure the wrist pin 46 to the arcuate portion 42 of the connecting rod 30. Preferably, the wrist pin insert 66 is cylindrical. Preferably, the fasteners are screws and thread into the wrist pin insert.

Figure 3:
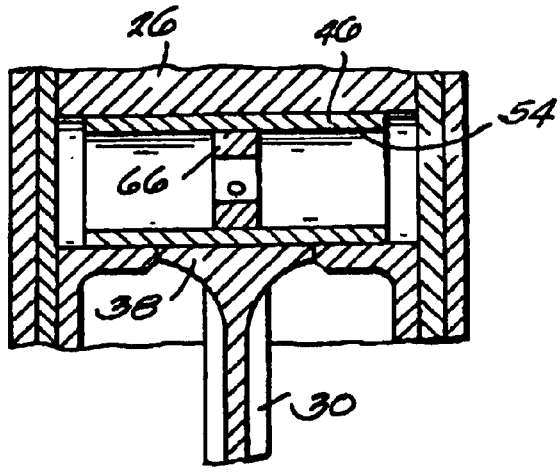
FIG. 3 is a cross-sectional view taken along line III—III of FIG. 2

As shown in FIG. 3, since the upper or second end 38 of the connecting rod 30 does not encircle the wrist pin 46, the piston 26 bears against the wrist pin 46 along the entire top of the wrist pin 46, thereby more evenly distributing the load on the wrist pin 46. The use of the wrist pin insert 66 further increases the strength and stability of the wrist pin 46. The forced rocking of the wrist pin 46 as the connecting rod 30 pivots, and the increased bearing surface area of the wrist pin 46 minimizes uneven wear on the wrist pin 46 bearing surface during operation of the engine 10.

Figure 6:
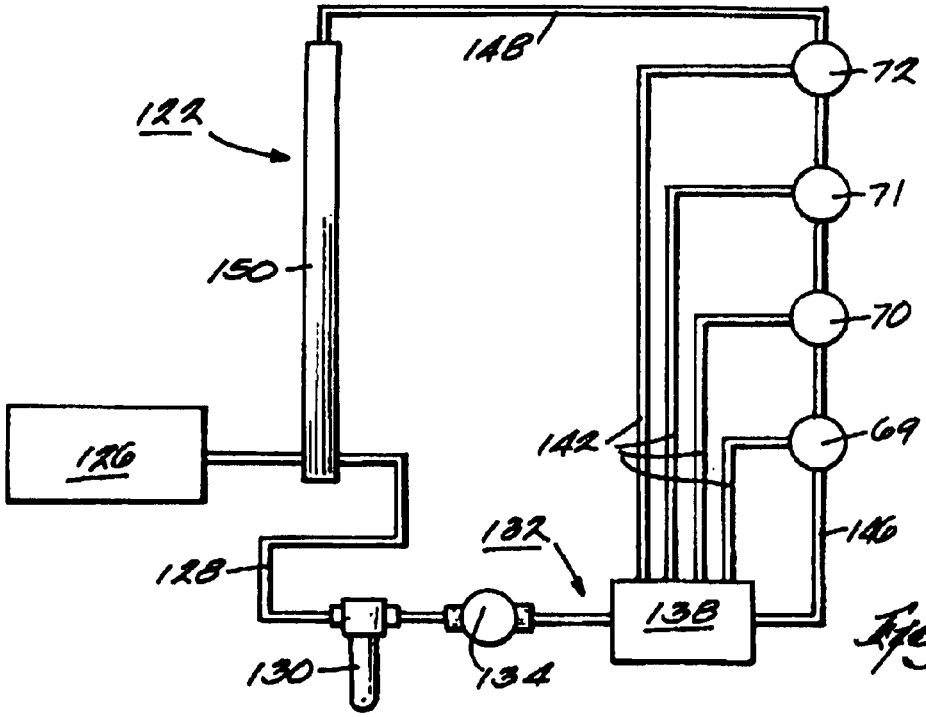
FIG. 6 is a schematic of a fuel injection system for the engine of FIG. 1.
Figure 4:
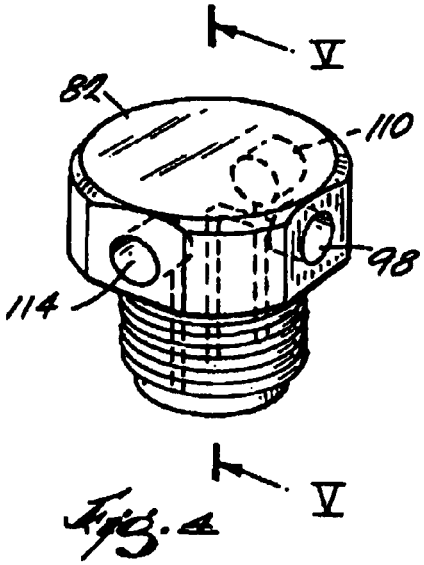
FIG. 4 is a perspective view of a fuel injector body of the engine of FIG. 1.
Figure 5:
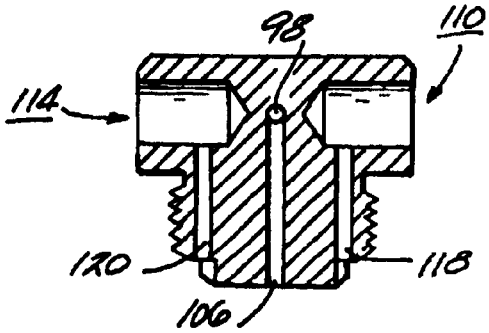
FIG. 5 is a cross-sectional view taken along line V—V of FIG. 4.
Figure 7:
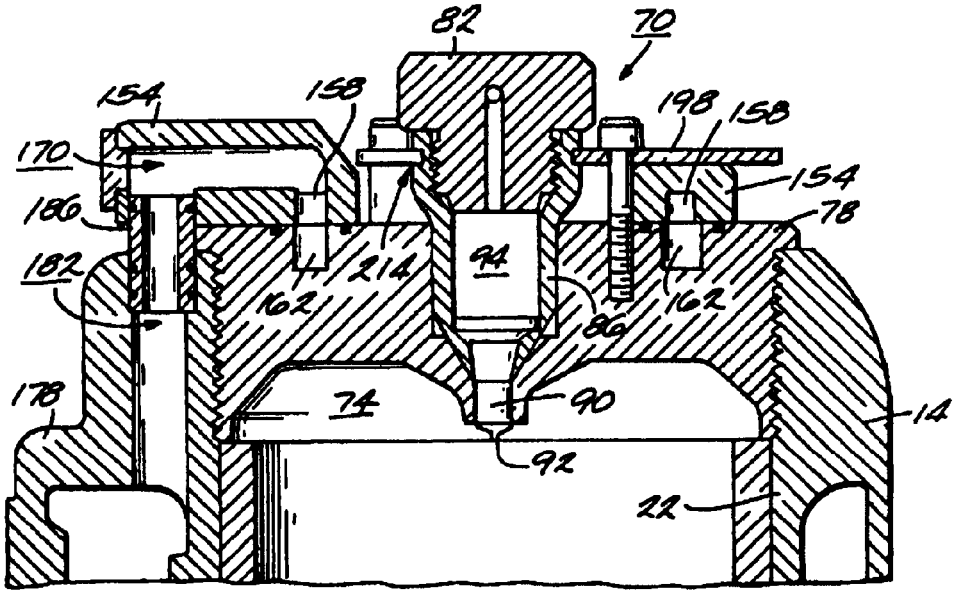
FIG. 7 is a cross-sectional view taken along line VII—VII of FIG. 8.

As shown schematically in FIG. 6, the engine 10 includes four fuel injectors 69, 70, 71 and 72, one for each cylinder. The fuel injectors are substantially identical, and only one will be described in detail. FIG. 7 illustrates in section, among other things, the fuel injector 70, which injects fuel into a combustion chamber 74 defined by a cylinder head 78, the cylinder 22 and the piston 26 (not shown in FIG. 7). The fuel injector 70 includes a fuel injector nut 86 which is received by an appropriately sized tapered bore in the cylinder head 78. Inside the nut 86 is a fuel injector tip 90 housing a pressure responsive, movable pintle (not shown). The nut 86 and the tip 90 define a main fuel outlet 92 communicating with the combustion chamber 74. A fuel injector body 82 is threaded into the upper end of the nut 86. As best shown in FIGS. 4 and 5, the fuel injector body 82 includes a main fuel inlet port 98, a portion of a fuel passage 106 which communicates between the main fuel inlet port 98 and the main fuel outlet port 92 (FIG. 7), a cooling fuel inlet port 110, a leak-off fuel outlet port 114, an upstream portion 118 of a cooling fuel passage which communicates between the cooling fuel inlet port 110 and the leak-off fuel outlet port 114, and a downstream portion 120 of the cooling fuel passage. Although not shown, the fuel injector further includes a flow straightener, a check valve, a check valve receiver, a spring mechanism and a spring guide, all of which are positioned within the hollow space 94 of the fuel injector nut 86 between the body 82 and the tip 90. Except for the cooling fuel inlet port 110 and the passage portion 118, the fuel injector 70 is conventional and known to those skilled in the art. The addition of the port 110 and the passage portion 118 allows cooling of the fuel injector as described below.

FIG. 6 illustrates a fuel flow schematic for a fuel injection system 122. Shown is fuel supply tank 126, fuel line 128, fuel filter 130, fuel pump 132 which includes delivery pump 134 and high pressure pump 138, fuel lines 142, bypass fuel line 146, fuel injectors 69, 70, 71 and 72, return fuel line 148 and return fuel tank 150. Referring also to FIGS. 4–5 and 7, overflow fuel expelled from the fuel pump 132 flows through the bypass fuel line 146, into the cooling fuel inlet port 110 of the fuel injector 69, through the inlet portion 118 of the cooling fuel passage in the fuel injector body 82, into the space below the fuel injector nut 86, where leak-off fuel normally flows, and around the flow straightener, the check valve, the check valve receiver, the spring mechanism and the spring guide, to commingle with the leak-off fuel, through the outlet portion 120 of the cooling fuel passage in the fuel injector body 82, and out the leak-off fuel outlet port 114 of the fuel injector body 82 where the leak-off fuel normally exits. The fuel flowing out of the port 114 of the fuel injector 69 then flows into the port 110 of the fuel injector 70 and flows through the fuel injector 70 in the same manner, and so on.

As can be appreciated, as the overflow fuel cools the fuel injectors, the overflow fuel is warmed. The overflow fuel is recirculated through the fuel injection system 122 by way of return fuel line 148. The warmed overflow fuel will flow through the fuel filter 130 on its way back to the fuel pump 132 to resist excessive build-up of ice on the fuel filter 130 during cold weather.

Figure 8:
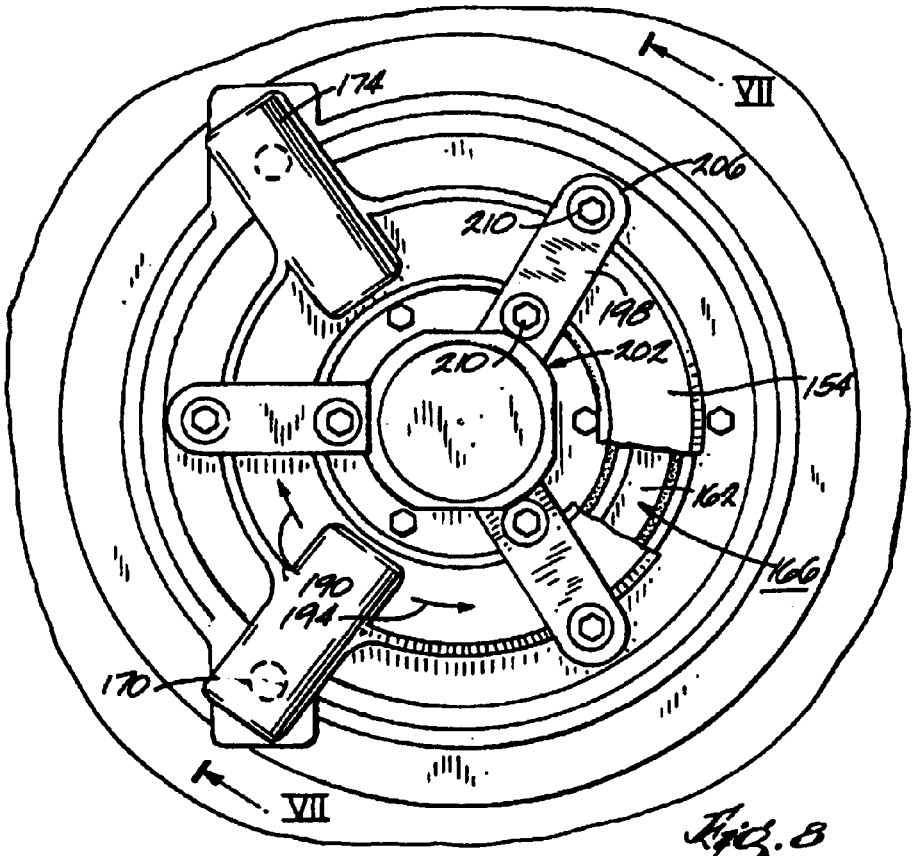
FIG. 8 is a top-view of FIG. 7.

FIGS. 7 and 8 illustrate a cooling cap 154 mounted on the cylinder head 78 to cool the cylinder head 78. The cooling cap 154 has an annular coolant groove 158 which mates with an annular coolant groove 162 of the cylinder head 78 to define an annular cooling passageway 166 when the cooling cap 154 is mounted on the cylinder head 78. The cooling cap 154 includes inlet 170 and outlet 174 ports which communicate with the annular cooling passageway 166, so that cooling fluid can flow into the inlet port 170, through the annular cooling passageway 166 and out the outlet port 174, thereby cooling the cylinder head 78.

The engine block 14 includes a cooling jacket 178 with an outlet 182 and an inlet (not shown). The cooling cap 154 is placed on the cylinder head 78 with the inlet port 170 in alignment with the outlet port 182 of the cooling jacket 178 and the outlet port 174 in alignment with the inlet port of the cooling jacket 178. A first transfer tube 186 communicates between the inlet port 170 of the cooling cap 154 and the outlet port 182 of the cooling jacket 178, and a second transfer tube (not shown) communicates between the outlet port 174 of the cooling cap 154 and the inlet port of the cooling jacket 178.

As shown, the inlet port 170 and the outlet port 174 of the cooling cap 154 are not diametrically opposed around the annular cooling passageway 166. Thus, a first portion of the annular cooling passageway 166 extends in one direction from the inlet port 170 to the outlet port 174 (representatively shown as arrow 190 in FIG. 8) and a second portion of the annular cooling passageway 166 extends in an opposite direction from the inlet port 170 to the outlet port 174 (representatively shown as arrow 194 in FIG. 8). The first portion of the annular cooling passageway 166 is shorter in length than the second portion of the annular cooling passageway 166. So that the flow rate through the annular cooling passageway 166 in either direction is proportional to the distance traveled, the first portion of the annular cooling passageway 166 is restricted. In this way, cooling fluid travels in both directions through the annular cooling passageway 166 to cool the cylinder head 78.

The cooling cap 154 is adjustably positionable around the cylinder head 78, so that the inlet port 170 and the outlet port 174 are properly alignable with the associated inlet and outlet ports of the cooling jacket 178. This is especially advantageous for a preferred embodiment of the present invention in which the cylinder head 78 threads into the cylinder block or engine block 14. As shown, the engine block 14 includes female threads concentric with the cylinder 22, and the cylinder head 78 includes male threads which engage the female threads of the engine block 14. Because the cylinder head 78 threads into the engine block 14, it is not exactly known where the cylinder head 78 will be located with respect to the engine body 14. Once the adjustable cooling cap 154 is properly located on the cylinder head 78, a plurality of clamping members 198, preferably equally spaced apart, span across the top of the cooling cap 154 to secure the cooling cap 154 to the cylinder head 78. Each of the clamping members 198 has opposite ends 202 and 206, and is secured to the cylinder head 78 by a pair of fasteners 210. One fastener 210 is located adjacent end 202 and the other fastener 210 is located adjacent end 206. Preferably, the fasteners 210 thread into the top of the cylinder head 78. Preferably, the cylinder head 78 includes a plurality of sets of pre-drilled, threaded holes such that each fastener 210 can be located in a plurality of positions relative to the cylinder head 78. Preferably, end 202 of each clamping member 198 is received by an annular groove 214 in the fuel injector nut 86, thereby also securing the fuel injector 70 to the cylinder head 78.

Figure 9:
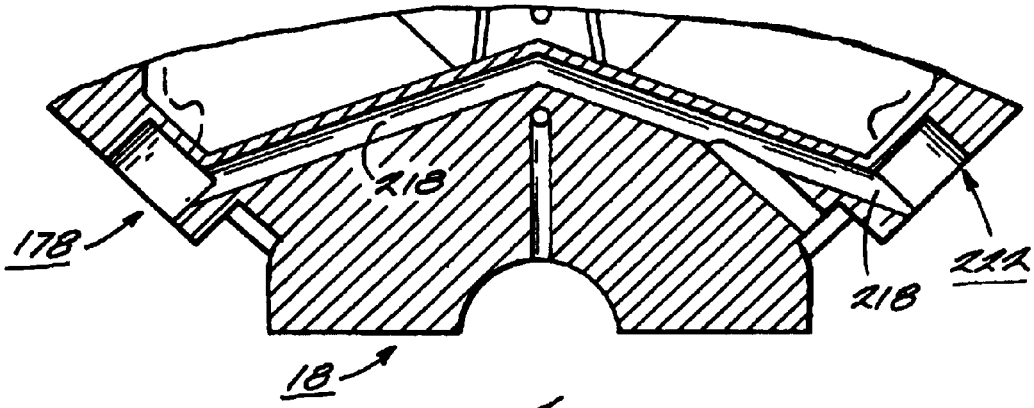
FIG. 9 is a sectional view illustrating the cross-feed passageway between the cylinder banks of the engine of FIG. 1.

FIG. 9 illustrates a cross-feed cooling passageway 218 which extends between a first cooling jacket 178 and a second cooling jacket 222 of the V-type engine of FIG. 1. The cross-feed cooling passageway 218 provides cooling fluid flow between the cooling jackets 178 and 222. The cross-feed cooling passageway 218 is drilled through the portion of the engine block 14 supporting the main bearing support for the crankshaft. The cut-away portion of FIG. 1 shows the general location of the cross-feed passageway 218 in the engine 10. If a thermostat communicating with the one of the cooling jackets 178 and 122 fails, the cross-feed cooling passageway 218 enables cooling fluid to continue to flow to minimize or prevent damage to the associated cylinder head 78. The cross-feed cooling passageway 218 also reduces the thermal gradient between the cylinder heads 78 and the lower crankcase of the engine 10 to increase engine life.

The foregoing description of the present invention has been presented for purposes of illustration and description. Furthermore, the description is not intended to limit the invention in the form disclosed herein. Consequently, variations and modifications commensurate with the above teachings in skill or knowledge of the relevant art, are within the scope of the present invention. The embodiments described herein are further intended to explain the best modes known for practicing the invention and to enable others skilled in the art to utilize the invention as such, or other embodiments and with various modifications required by the particular applications or uses of the present invention. It is intended that the appended claims are to be construed to include alternative embodiments to the extent permitted by the prior art.

Various features of the invention are set forth in the following claims.

What is claimed is:

1. An internal combustion engine, comprising:

an engine block at least partially defining a cylinder;

a piston reciprocally operable within said cylinder;

a cylinder head cooperating with said cylinder and said piston to define a combustion chamber; and a fuel injection system including:

a fuel injector for injecting fuel into said combustion chamber, said fuel injector having a fuel inlet port, a fuel outlet port, a fuel passage communicating between said fuel inlet port and said fuel outlet port, a cooling fuel inlet port, a leak-of fuel outlet port, and a cooling fuel passage communicating between said cooling fuel inlet port and said leak-off fuel outlet port;

a fuel pump;

a fuel supply line communicating between said fuel pump and said fuel inlet port;

a bypass fuel line communicating between said fuel pump and said cooling fuel inlet port, such that *all* overflow fuel from said fuel pump flows through said bypass fuel line, into said cooling fuel inlet port, through said cooling fuel passage and out of said leak-off fuel outlet port, thereby cooling said fuel injector, wherein *all of* the overflow fuel is recirculated from said leak-off fuel outlet port back to said fuel pump; and a fuel filter placed upstream of said fuel pump such that the overflow fuel recirculated to said fuel pump flows through said fuel filter prior to reaching said fuel pump, and such that the overflow fuel which cools said fuel injector is warmed as it flows through said fuel injector, thereby heating the fuel which flows through said fuel filter to substantially prevent ice build-up on said fuel filter during cold weather.

2. An internal combustion engine according to claim 1, wherein said fuel injector includes a fuel injector body which includes said fuel inlet port, said cooling fuel inlet port and said leak-off fuel outlet port.

3. An internal combustion engine according to claim 2, wherein said fuel injector further includes a fuel injector nut, such that said fuel injector body threads into said fuel injector nut, and such that said cooling fuel passage includes a space within said fuel injector nut, so that the overflow fuel commingles with leak-off fuel in said space and exits with leak-off fuel out of said leak-off fuel outlet port.

4. An internal combustion engine according to claim 1, where said engine is a two-stroke, diesel aircraft engine.

5. An internal combustion engine according to claim 3, wherein said cooling fuel passage also includes, in said fuel injector body, an upstream portion between said cooling fuel inlet port and said space, and a downstream portion between said space and said leak-off fuel outlet port.

[6. A two-stroke, diesel aircraft engine comprising:

an engine block at least partially defining a cylinder;

a piston reciprocally operable within said cylinder;

a cylinder head cooperating with said cylinder and said piston to define a combustion chamber; and a fuel injection system including:

a fuel injector for injecting fuel into said combustion chamber, said fuel injector including a fuel injector nut, and a fuel injector body threaded into said fuel injector nut so as to define within said fuel injector nut a space into which leak-off fuel normally flows, said fuel injector body having therein a fuel inlet port, a cooling fuel inlet port, a leak-off fuel outlet port, an upstream cooling fuel passage portion between said cooling fuel inlet port and said space, and a downstream cooling fuel passage portion between said space and said leak-off fuel outlet port, and said fuel injector also including a fuel outlet port, and a fuel passage communicating between said fuel inlet port and said fuel outlet port;

a fuel pump;

a fuel supply line communicating between said fuel pump and said fuel inlet port;

a bypass fuel line communicating between said fuel pump and said cooling fuel inlet port, such that overflow fuel from said fuel pump flows through said bypass fuel line, into said cooling fuel inlet port, through said upstream cooling fuel passage portion and into said space, where the overflow fuel commingles with leak-off fuel in said space, through said downstream cooling fuel passage portion and out of said leak-off fuel outlet port, thereby cooling said fuel injector; and a fuel return line conducting the overflow fuel from said leak-off fuel outlet port back to said fuel pump.]

[7. An engine according to claim 6, wherein said fuel injection system further includes a fuel filter in said fuel return line upstream of said fuel pump such that the overflow fuel flows through said fuel filter prior to reaching said fuel pump, and such that the overflow fuel which cools said fuel injector is warmed by said fuel injector, thereby resisting ice build-up on said fuel filter during cold weather.]

*8. An internal combustion engine according to claim 1, wherein said fuel injection system includes a fuel supply tank and a return fuel tank in fluid communication with the fuel supply tank, and wherein all of the overflow fuel is recirculated from said leak-off fuel outlet port, through said return fuel tank, and back to said fuel pump.*

*9. An internal combustion engine according to claim 8, further comprising a fuel return line conducting all of the overflow fuel from said leak-off fuel outlet port back to said return fuel tank.*

*10. An internal combustion engine, comprising:*

*an engine block at least partially defining a cylinder;*

*a piston reciprocally operable within said cylinder;*

*a cylinder head cooperating with said cylinder and said piston to define a combustion chamber; and*

*a fuel injection system including:*

*a fuel supply tank;*

*a return fuel tank in fluid communication with the fuel supply tank;*

*a fuel injector for injecting fuel into said combustion chamber, said fuel injector having a fuel inlet port, a fuel outlet port, a fuel passage communicating between said fuel inlet port and said fuel outlet port, a cooling fuel inlet port, a leak-off fuel outlet port, and a cooling fuel passage communicating between said cooling fuel inlet port and said leak-off fuel outlet port;*

*a fuel pump;*

*a fuel supply line communicating between said fuel pump and said fuel inlet port;*

*a bypass fuel line communicating between said fuel pump and said cooling fuel inlet port, such that overflow fuel from said fuel pump flows through said bypass fuel line, into said cooling fuel inlet port, through said cooling fuel passage and out of said leak-off fuel outlet port, thereby cooling said fuel injector, wherein the overflow fuel is recirculated from said leak-off fuel outlet port, through said return fuel tank, and back to said fuel pump.*

*11. An internal combustion engine according to claim 10, further comprising a fuel filter placed upstream of said fuel pump such that the overflow fuel recirculated to said fuel pump flows through said return fuel tank and said fuel filter prior to reaching said fuel pump, and such that the overflow fuel which cools said fuel injector is warmed as it flows through said fuel injector, thereby heating the fuel which flows through said fuel filter to substantially prevent ice build-up on said fuel filter during cold weather.*

*12. An internal combustion engine according to claim 10, wherein said fuel injector includes a fuel injector body which includes said fuel inlet port, said cooling fuel inlet port and said leak-off fuel outlet port.*

*13. An internal combustion engine according to claim 12, wherein said fuel injector further includes a fuel injector nut, such that said fuel injector body threads into said fuel injector nut, and such that said cooling fuel passage includes a space within said fuel injector nut, so that the overflow fuel commingles with leak-off fuel in said space and exits with leak-off fuel out of said leak-off fuel outlet port.*

*14. An internal combustion engine according to claim 13, wherein said cooling fuel passage also includes, in said fuel injector body, an upstream portion between said cooling fuel inlet port and said space, and a downstream portion between said space and said leak-off fuel outlet port.*

*15. An internal combustion engine according to claim 10, where said engine is a two-stroke, diesel aircraft engine.*

*16. An internal combustion engine according to claim 10, further comprising a fuel return line conducting the overflow fuel from said leak-off fuel outlet port back to said return fuel tank.*

* * * * *